United States Patent

Takata

Patent Number: 5,381,879
Date of Patent: Jan. 17, 1995

[54] TORQUE ABSORBER

[75] Inventor: Nobuo Takata, Yao, Japan

[73] Assignee: THK MENT Research Co., Ltd., Osaka, Japan

[21] Appl. No.: 938,035

[22] PCT Filed: Jan. 30, 1992

[86] PCT No.: PCT/JP92/00092

§ 371 Date: Oct. 26, 1992

§ 102(e) Date: Oct. 26, 1992

[87] PCT Pub. No.: WO92/16766

PCT Pub. Date: Oct. 1, 1992

[30] Foreign Application Priority Data

Mar. 18, 1991 [JP] Japan ................................. 3-052558

[51] Int. Cl.⁶ ....................... F16D 43/20; F16D 41/06
[52] U.S. Cl. ................................ 192/45; 192/56 R
[58] Field of Search ................ 192/45, 44, 48.92, 56 R

[56] References Cited

U.S. PATENT DOCUMENTS

| | | | |
|---|---|---|---|
| 1,670,197 | 5/1928 | Humfrey | 192/45 |
| 1,955,879 | 4/1934 | Griswold | 192/48.92 |
| 3,557,921 | 1/1971 | Takada | |
| 5,035,309 | 7/1991 | Takada | 192/45 |
| 5,109,964 | 5/1992 | Fukui et al. | 192/45 X |

FOREIGN PATENT DOCUMENTS

| | | |
|---|---|---|
| 51-21093 | 6/1976 | Japan . |
| 58-52092 | 11/1983 | Japan . |
| 1-60698 | 12/1989 | Japan . |
| WO89/03941 | 5/1989 | WIPO ............ 192/45 |

Primary Examiner—Rodney H. Bonck
Attorney, Agent, or Firm—Jordan and Hamburg

[57] ABSTRACT

A torque absorber adapted for power transmission systems, in which raceway surfaces of the inner and outer rings are of mono-hyperboloid of revolution, rollers are arranged between the raceways so as to come into line contact with the raceways at an angle slanting to a plane including the center axis of the inner ring, a power transmission rotation body or the housing is connected to the inner and outer rings through a bearing or pins, and a spring plate is provided therein to push the outer ring.

3 Claims, 11 Drawing Sheets

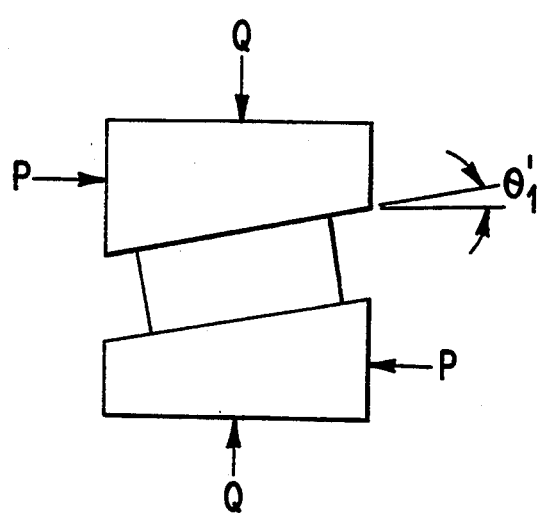
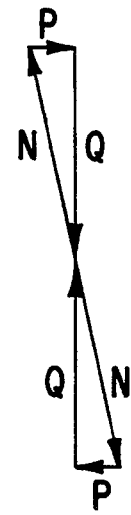
FIG.6a  FIG.6b
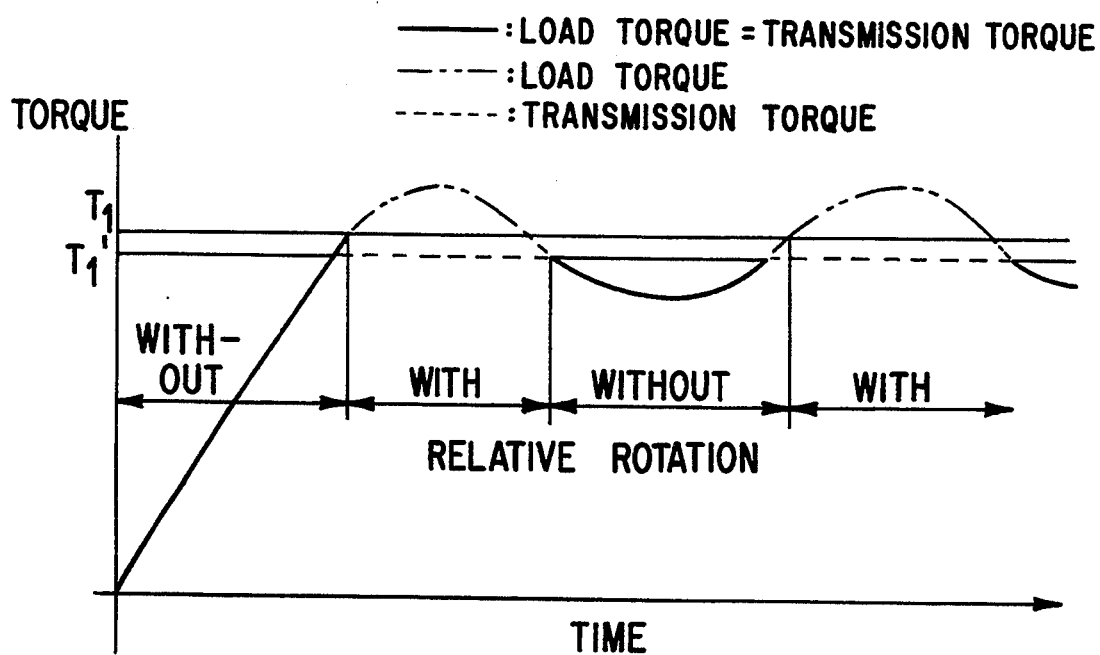
FIG.7

TORQUE ABSORBER

This invention relates to a torque absorber which can absorb a difference present in driver side torque and follower side torque in a power transmission system.

There may be in a power transmission system a case where a torque higher than expected applies to the driver-to-follower connection portion of the system or an impulsive torque generates a large torque exceeding the rated torque, while loading is changing, or the driving device is first initiated and connected to accelerate the follower device. In such a case, with the prior art, a torque limiter, auto tensioner, clutch or brake is used to absorb the differential torque.

According to the prior art, however, in order to absorb the torque, two bodies are depressed to each other to generate a friction force between them, or a fluid or powder is incorporated in the device to use its stirring friction, or a magnetic force is utilized. In the above cases, the prior art must involve a sliding friction, thus producing an irregular torque setting due to the difference between static friction and dynamic friction.

For example, some type of torque limiter uses a tightening force through a rotation of coil spring and the like, for obtaining a friction force. With the type, however, since not only a friction coefficient between the spring and the friction members depends on their temperature, thus sometimes changing the friction force, but also the inclusion of spring and the like may have a difficulty in maintaining a high dimensional accuracy of the transmission system, an exact setting of limit torque cannot be expected. Further, such construction cannot transmit or absorb such a large torque as actually required.

SUMMARY OF THE INVENTION

To solve the above problems, the present invention intends to provide a compact torque absorber in which not only limit torque can be set with a high accuracy, but also large torque can be transmitted or absorbed, as follows:

A torque absorber according to the present invention comprises:
- an inner rotation body, an outer rotation body, a plurality of intermediate rotation bodies, an energizing means and a power transmission rotation body; and
- the inner rotation body is provided with an inner raceway track of mono-hyperboloid of revolution about one axis;
- the outer rotation body is provided with an outer raceway track of mono-hyperboloid of revolution about the axis;
- the inner raceway track and the outer raceway track are oppositely faced with each other to form a set of combined raceways;
- the center axis of the intermediate rotation bodies with a cylindrical rolling surface is arranged in a circumferential direction of the raceway at an angle to a cross section including the axis, and the surface of the intermediate rotation bodies is arranged so as to come into linear contact with the inner raceway and the outer raceway;
- the power transmission rotation body is arranged on one end side of the outer rotation body and around the end side of the inner rotation body through a bearing, so as to be rotatable relative to the inner rotation body while keeping a constant axial position relative to the inner rotation body, and is connected with the outer rotation body by a torque transmission means which transmits a torque between said power transmission rotation body and said outer rotation body; and
- the energizing means is arranged between the power transmission rotation body and the outer rotation body, and, when the inner rotation body or the outer rotation body is rotating in such a direction as to widen the raceway gap, energizes the outer rotation body in the axial direction and in such a direction as to narrow the gap, so that a rotational resistance equal to the maximum torque transmitted between the inner rotation body and the outer rotation body can be given between the intermediate rotation bodies and the inner rotation body / the outer rotation body.

A torque absorber of the present invention comprises:
- an inner rotation body, an outer rotation body, a plurality of intermediate rotation bodies, an energizing means, a power transmission rotation body and a movement stop member; and
- the inner rotation body is provided with an inner raceway track of mono-hyperboloid of revolution about one axis;
- the outer rotation body being provided with an outer raceway track of mono-hyperboloid of revolution about the axis;
- the inner raceway track and the outer raceway track are oppositely faced with each other to form a set of combined raceways;
- the center axis of the intermediate rotation bodies with a cylindrical rolling surface is arranged in a circumferential direction of the raceway at an angle to a cross section including the axis, and the surface of the intermediate rotation bodies is arranged so as to come into linear contact with the inner raceway and the outer raceway;
- the power transmission rotation body is arranged on one end side of the outer rotation body and around the end side of the inner rotation body through a bearing, so as to be rotatable relative to the inner rotation body while keeping a constant axial position relative to the inner rotation body, and is connected with the outer rotation body by a torque transmission means which transmits a torque between said power transmission rotation body and said outer rotation body;
- the energizing means is arranged between the power transmission rotation body and the outer rotation body, to energize the outer rotation body in the axial direction and in such a direction as to narrow the raceway gap; and
- the movement stop member is provided to bring the movement of the outer rotation body in the direction to narrow the raceway gap to a stop at a given position through a guide bearing.

A torque absorber of the present invention comprises:
- an inner rotation body, an outer rotation body, a plurality of first intermediate rotation bodies, a plurality of second intermediate rotation bodies, an energizing means and a power transmission rotation body; and
- the inner rotation body is provided with an inner raceway track of mono-hyperboloid of revolution about one axis;

the outer rotation body is provided with an outer raceway track of mono-hyperboloid of revolution about the axis;

the inner raceway track and the outer raceway track are oppositely faced with each other to form a set of combined raceways;

the respective center axes of the first large-diameter intermediate rotation bodies and the second small-diameter intermediate rotation bodies both with a cylindrical rolling surface are arranged in a circumferential direction of the respective raceways at angles respectively facing each other to respective cross sections including the respective axes, and the surface of the respective intermediate rotation bodies is arranged so as to come into linear contact with the inner raceway and the outer raceway;

the power transmission rotation body is arranged on one end side of the outer rotation body and around the end side of the inner rotation body through a bearing, so as to be rotatable relative to the inner rotation body while keeping a constant axial position relative to the inner rotation body, and is connected with the outer rotation body by a torque transmission means which transmits a torque between said power transmission rotation body and said outer rotation body; and the energizing means is arranged between the power transmission rotation body and the outer rotation body, to energize the outer rotation body in the axial direction and in such a direction as to narrow the raceway gap.

A torque absorber of the present invention is further characterized in that the second intermediate rotation bodies have a spherical rolling surface rather than cylindrical.

A torque absorber of the present invention comprises:

an inner rotation body, a first outer rotation body, a second outer rotation body, a plurality of first intermediate rotation bodies, a plurality of second intermediate rotation bodies, an energizing means and a power transmission rotation body; and the inner rotation body is provided with first and second inner raceway tracks of mono-hyperboloid of revolution both formed in parallel to each other in the same axial direction;

the first and second outer rotation bodies respectively are provided with first and second outer raceway tracks of mono-hyperboloid of revolution about the axis;

the first and second inner raceway tracks and the first and second outer raceway tracks respectively are oppositely faced with each other to form first and second raceways;

the respective center axes of the first intermediate rotation bodies and the second intermediate rotation bodies both with a cylindrical rolling surface are arranged in a circumferential direction of the respective first and second raceways at angles respectively facing each other to respective cross sections including the respective axes, and the surface of the respective first and second intermediate rotation bodies is arranged so as to come into linear contact with the first and second inner raceways and the first and second outer raceways;

the power transmission rotation body is arranged on one end side of the first outer rotation body and around the end side of the inner rotation body through a bearing, so as to be rotatable relative to the inner rotation body while keeping a constant axial position relative to the inner rotation body, and is connected with the first outer rotation body by a first torque transmission means which transmits a torque between said power transmission rotation body and said outer rotation body;

the energizing means is arranged between the power transmission rotation body and the first outer rotation body, to energize the first outer rotation body in the axial direction and in such a direction as to narrow the raceway gap; and the first and second outer rotation bodies are connected to each other through a second torque transmission means for transmitting a torque, and, while they are not rotating, are so arranged in the same axial direction that, energized by the energizing means, the first intermediate rotation body or the second intermediate rotation body comes into contact with the first inner raceway surface and the first outer raceway surface or with the second inner raceway surface and the second outer raceway surface.

In power transmission systems, the load or output component may be suddenly subjected to a sharp excessive torque from an obstacle (for example, sudden stop or binding of the driven component caused by an obstacle or foreign matter) or the rotating driver may be suddenly connected to the follower so far in a halt, when an impulsive torque may be induced at the interface of the driving and driven sides. This torque T to be induced may be expressed as follows:

$$T = I \times dw/dt$$

, where I is moment of inertia of the driving or driven system, w is angular velocity, and t is time. Therefore, if a large difference in rotation speed or angular velocity is to be absorbed in a short time, intending to gather the speed of the driven system to that of the driving system, the interface may be subjected to an excessive torque, as large as several times the capacity of the clutch or other transmission.

In the configuration of the torque absorber according to the present invention, as described above:

When the inner rotation body or the outer rotation body is rotated in a direction at which the raceway gap is widened by the intermediate rotation bodies, that is, in the free rotation direction, the produced torque may be absorbed by a rolling resistance appearing when the intermediate rotation bodies roll against a thrust acting to narrow the raceway gap.

On the other hand, for example, when the driving side of a power transmission system is connected to the inner rotation body while the driven load side is connected to the power transmission rotation body, and when the inner rotation body is rotated in a given direction (that is, in a direction to narrow the raceway gap or in the clutch side), the tilted intermediate rotation bodies may rotate on their own axes and as a whole revolve around the inner rotation body guided thereby, while keeping a line contact with the inner rotation body. Therefore, pushed by the energizing means and guided by the intermediate rotation bodies, like the advancing of a tapered screw, the outer rotation body in line contact with the intermediate rotation bodies may advance in the axial direction so as to narrow the raceway gap, that is, toward the clutch side, and further generate a relative twisting angle to the inner rotation body, finally causing the intermediate rotation bodies to be locked in the raceway track by a wedge action, so that a torque equivalent to the advancement or the twisting angle may be transmitted to the load side through the inner rotation body, the outer rotation body and the power transmission rotation body.

Assuming the advancement δ of the outer rotation body (corresponding to the torsion angle α), the torque Tl to be transmitted is expressed as follows:

$$Tl = A\delta^{3/2} \quad (Tl = A'\delta^{3/2}) \tag{1}$$

, where A (A') is a torsion spring constant, depending on the torque absorber construction.

On the other hand, assume that the movement of the outer rotation body is restricted by some means or other. Then, if a torque exceeding Tl should happen in the torque absorber, the outer rotation body cannot advance farther, thus failing to transmit the surplus torque. Accordingly, the surplus torque may cause a rotational slip of the outer rotation body relative to the inner rotation body while absorbing the torque amount of Tl, thereby resulting in a gradual or time-taking absorption of an impulsive torque if the load is subjected to the excessive or impulsive torque.

The impulsive torque T may rise to several times the maximum transmission torque Tl (assuming to be the torque rating or capacity of the torque absorber), if the I/O systems are instantly connected to each other. In such a case, the present invention can successfully solve possible problems to be encountered, based on the above described principle, as follows in more detail for each of the aspects of the present invention:

First, in a power transmission system using the torque absorber of the present invention, in which the energizing force of the energizing means is so designed as to provide a rotational resistance equivalent to the maximum design transmission torque, the torque absorber is so connected to the driving and driven sides that, when the system is transmitting the input torque to the driven side, the driving side is so rotated (while receiving the rotational resistance) in such a direction as to widen the raceway track gap or to the free-rotation direction. Therefore, if load torque increases or is inputted rapidly, the so far existing clutch state may be broken, thus causing the inner and outer rotation bodies to slip relative to each other in the free rotation side, resulting in the transmission torque to be reduced lower than the maximum transmission torque to absorb input torque, while keeping the rotation of the driver side. Therefore, the power transmission system can be successfully used, for example, as an auto tension or constant torque mechanism.

Secondly, in a power transmission system using the torque absorber of the present invention, in which the movement stop member brings to a stop through the bearing the movement of the outer rotation body to narrow the raceway track gap, if the driving and driven sides are connected in a direction for them to rotate in the clutch side, a chance where the movement or torsion amount exceeds a given value would never take place, thus causing the driving and driven sides to safely slip at a torque Tl corresponding to the movement or torsion amount, resulting in a relative rotation of them which can absorb a fluctuating torque or can function as torque limiter while absorbing the torque. In this case, since the outer rotation body receives the stopping force of the movement stop member through the bearing, the rotation may be made smoothly, thus promising a successful operation as torque limiter.

Thirdly, in a power transmission system using the torque absorber according to the present invention, in which the second intermediate rotation bodies of small diameter are arranged at an angle with the system axis oppositely to that of the first intermediate rotation bodies of large diameter, when a torque is so applied as to narrow the raceway track gap and causes the outer rotation body to be screwed in, the first intermediate rotation bodies may receive a vertical load (radial) in between the inner and outer rotation bodies to deform elastically, and finally when the outer rotation body is screwed in by a given length, the second intermediate rotation bodies may come into contact with the inner and outer rotation bodies. But, since the second intermediate rotation bodies and the first intermediate rotation bodies are arranged at angles opposite to each other, they can not only support the radial load but also can widen the raceway track gap while rotating. As a result, the outer rotation body cannot be screwed in farther, thus permitting the torque absorber to absorb the torque while rotating. The positive operation can successfully promise the application of the torque absorber to e.g., ON-OFF clutch.

Fourthly, in a power transmission system using the torque absorber of the present invention, in which the second spherical-shaped intermediate rotation bodies of small diameter are arranged in between the two or more first intermediate rotation bodies each arranged in the circumferential direction, when the first intermediate rotation bodies deform elastically, the inner rotation body and the outer rotation body both are supported by the second spherical-shaped intermediate rotation bodies acting as radial bearing, and may slip to each other, thus preventing an excessive torque from being applied.

Fifthly, in a power transmission system using the torque absorber according to the present invention, if the first intermediate rotation bodies contact with the first inner raceway track and the first outer raceway track, the first and second intermediate rotation bodies are arranged at angles with their identical axis opposite to each other, so that, when the inner rotation body is rotated in a given direction, the first and second outer rotation bodies advance in the axial directions opposite to each other. Therefore, when the inner rotation body is rotated in a given direction, the torque absorber can absorb a torque, which causes the first outer rotation body to rotate relatively to the inner rotation body, thus moving the first outer rotation body in a direction to narrow the raceway track gap. Then, the first outer rotation body pushes the second outer rotation body which is rotating and moving in a direction to widen the raceway track gap while keeping a constant spacing with the second intermediate rotation bodies, until the second outer rotation body comes in perfect contact with the inner rotation body through the second intermediate rotation bodies. At that time, the movement of the first outer rotation body in a direction to narrow the raceway track gap is stopped by the second outer rotation body, thus restricting further absorption or transmission of the torque, while keeping slip rotation off the first and second outer rotation bodies relative to the inner rotation body.

On the other hand, if the second intermediate rotation bodies contact with the second inner raceway track and the second outer raceway track, and when the inner rotation body is rotated in a direction opposite to the above given direction, the components in the torque absorber may operate in a reverse way to the above, thus also restricting the absorption or transmission of a torque larger than a predetermined value.

Now preferable embodiments of the torque absorber according to the present invention will be described, referring to the accompanying drawings.

BRIEF DESCRIPTION OF THE DRAWINGS

FIGS. 6(a) and 6(b) are schematic diagrams showing the relation between pushing forces and induced vertical forces on contact surfaces;

FIG. 7 is a curve showing a typical change in transmission torque;

DETAILED DESCRIPTION OF THE INVENTION

Figure 1:
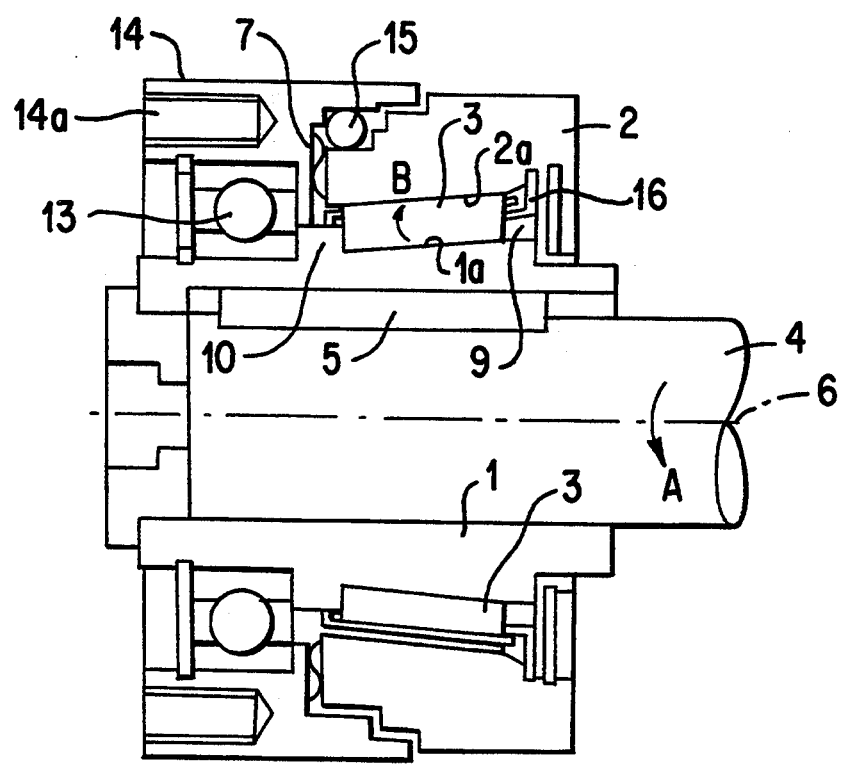
FIG. 1 is a sectional view showing an embodiment of the present invention.

In the drawings: An inner ring 1 embodying the inner rotation body in the previous description is mounted firmly on a shaft 4, which may be the input shaft or the output shaft of the torque absorber, by e.g., a key engagement 5. An outer ring 2 embodying the outer rotation body is disposed facing the inner ring 1 to form a combination of raceways 9 between them.

Figure 2:
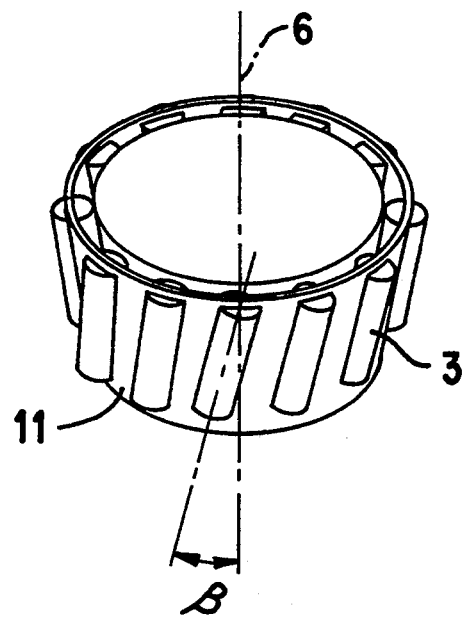
FIG. 2 is a perspective view showing the arrangement the rollers in the intermediate rotation body in the above embodiment.

A plurality of rollers 3 embodying the intermediate rotation body are, as shown in FIG. 2, disposed between the raceways 9 slanting to a plane including a central axis 6 of the inner ring 1 (or the output or input shaft 4) at angle $\beta$ (e.g., 15°).

On one side (e.g., left side as shown in FIG. 1) of the inner ring 1 which is also the left side end of the outer ring 2, a bearing 13 is mounted to carry the radial lead of the output shaft or the input shaft and the thrust lead off a spring plate 7 embodying the energizing means. On the bearing 13 is mounted a housing 14 embodying the power transmission rotation body in order to transmit a torque to the input shaft or the output shaft of the torque absorber. The housing 14 can rotate around the bearing 13, but the axial movement of the housing 14 is restricted by the bearing 13, so that it remains at a constant position relative to the inner ring 1. The outer ring 2 is connected with the housing 14 movably in the axial direction through a torque transmission means such as a ball spline 15 or torque transmission pin, or involute spline (not shown), in order to transmit the input or output torque. The housing 14 can be an input side or output side of the torque absorber by inserting mounting bolts into holes 14a for connection.

The spring plate 7 is located between the housing 14 and the outer ring 2, to push away the outer ring 2 all the time to a direction so as to narrow the gap of the raceways 9 (in FIG. 1, left to right). The magnitude of the pushing force is designed to be large enough to transmit the maximum torque required for the torque absorber (later described in detail).

The inner and outer rings 1 and 2 respectively are provided with flanges 10 and 16, to restrict an axial movement of the rollers 3 when the rollers 3 tend to advance in the axial direction in the gap of the raceways 9.

In FIG. 2, the rollers 3 are arranged on the inner ring 1 so as to slant to a section including the axis 6 thereof by an angle of $\beta$. The rollers 3 are retained in place by a retainer 11 to keep them off each other. This configuration can prevent adjacent rollers 3 (each rotating about its axis in a same direction) from running against each other with a relative tangential speed in an opposite direction, resulting in a smooth rotation of the rollers 3 about their axes and a smooth revolution thereof around the inner ring 1.

The rollers 3 are of cylindrical shape and the raceways 9 of the inner and outer rings 1 and 2 are of monohyperboloid of revolution around the common axis so that the rollers 3 and the raceways 9 come into linear contact with each other (later described in more detail).

Here, let us assume that the shaft 4 is the input shaft, and the shaft 4 rotates the inner ring 1 in the A direction in FIG. 1 so that the raceway gap tends to be large (or in the free rotation side). Then, this configuration of the torque absorber as described above in detail causes rollers 3 to be guided toward the inner ring raceway 1a and be going down thereon while each rotating in the B direction, resulting in the leftward movement. Since the rollers 3 would move to the right direction relative to the outer ring raceway 2a, the outer ring 2 is guided by the rollers 3 (being guided toward the inner ring raceway 1a), to move against the energizing force of the spring 7 so that it moves to the left direction so as to widen the raceways 9 gap. As a result, a wedge action of the rollers assisted by the spring plate 7 may decrease, thus relaxing the locking force between the raceways 9, resulting in less torque to be transmitted to the housing 14 or the output side from the input shaft 4 through the ball spline 15.

Figure 3:
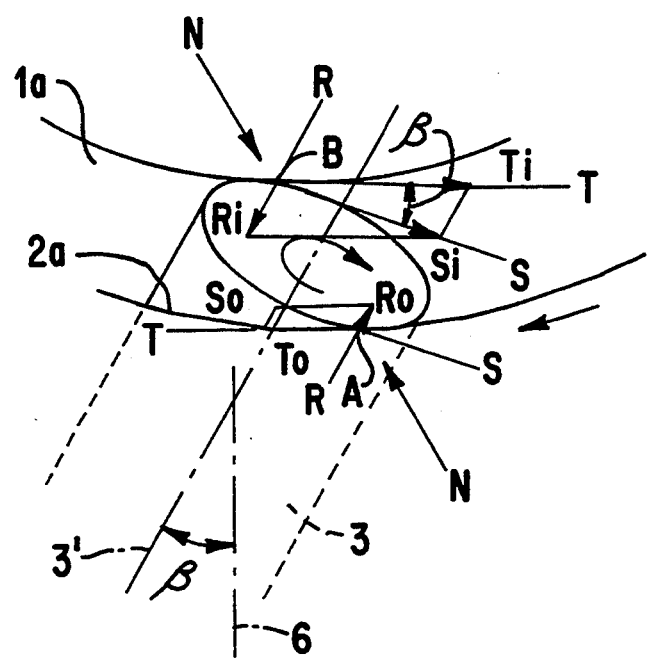
FIG. 3 is a schematic diagram showing forces acting between the rollers and the inner and outer rotation bodies.

FIG. 3 is a schematic diagram showing forces acting between the rollers 3 and the inner and outer rings 1 and 2 caused by such movement of the rollers 3 as described above:

Each of the rollers 3 makes a linear contact (strictly speaking, a plane contact with a small width) with the inner and outer raceways 1a and 2a. For simplification, consider contact points A and B, on the contact planes. Since the axis 3' of a roller 3 is arranged slanting to a section including the shaft axis 6 by an angle of $\beta$, the roller's rotational direction S has a slant angle of $\beta$ relative to directions T tangential to the raceways $1a$ and $2a$. Therefore, when the rollers 3 are rotating on the raceways $1a$ and $2a$, as shown in FIG. 3, each roller 3 would be applied by tangential forces Ti and To and radial forces Ri and Ro.

The radial forces Ri and Ro applied on the rollers 3 may tend to remove the inner and outer rings 1 and 2 away from each other in opposite axial directions of the shaft 4. With this embodiment in which the position of the inner ring 1 is fixed to the shaft 4, the outer ring 2 may tend to move to the left in FIG. 1, so as to widen the gap the raceways 9. Such forces acting on the inner and outer rings 1 and 2 may tend to reduce the energizing force or the spring plate 7 as described above.

Figure 4:
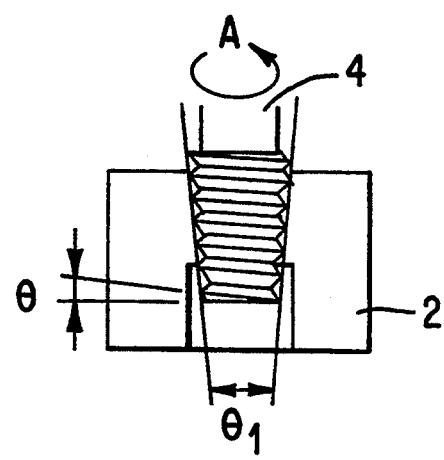
FIG. 4 is a schematic diagram showing the action of a tapered screw.
Figure 5:
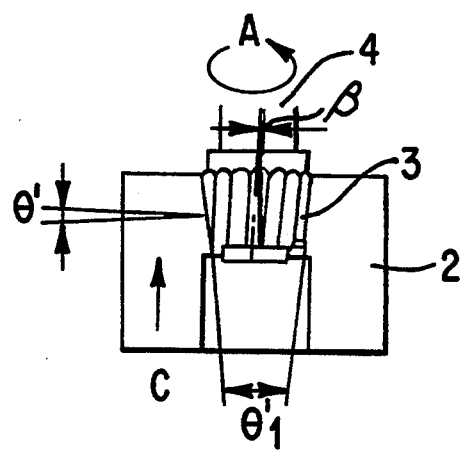
FIG. 5 is a schematic diagram showing the action of the actual components similar to that of the above tapered screw.

FIGS. 4 and 5 are schematic diagrams showing the action of the torque absorber introduced by such movements of the inner and rings 1 and 2 and the rollers 3: The action is similar to the one caused by the tapered screw shown in FIG. 4. As shown in FIG. 5, when the screw (or roller) 3 or the shaft 4 is rotated in the direction A, the outer ring 2 advances toward the direction C through the roller 3, thus causing the outer ring 2 to be locked with the shaft 4 as if a rotated tapered screw is locked with the mating thread. On the other hand, if the shaft 4 is rotated in the direction opposite to the direction A, the screw works loose to relieve the locking. When an energizing force of the spring plate 7 is additionally applied on the outer ring 2 in the direction C, the inner and outer rings 1 and 2 may rotate relative to each other while absorbing a torque corresponding to a difference of an energizing force acting on the outer ring 2 and a deenergizing force acting on both the rings 1 and 2. In this case, a lead angle $\theta$ and a tapered angle $\theta 1$ of the taper screw correspond to a twist lead angle $\theta'$ (equivalent to the slant angle $\beta$ of the roller 3) axed a contact angle $\theta'1$ of the torque absorber.

Now, description will be made to a torque transmitted between the inner and outer rings 1 and 2 by way of the pushing force P of the spring 7:

As shown in FIGS. 5 and 6, the force P applies a normal force N on a roller 3 and transmits a torque Tl, where $N = P \sin \theta'1$ $Tl = N \times PCD/2 = P \times PCD/2 \sin \theta'1$  (2)

(where PCD/2 = a distance between the shaft axis 6 and a rolling friction center)

Accordingly, an adequate selection of various design angles and dimensions of a torque absorber and a pushing force P of the spring 7 can obtain a desirable maximum transmission torque Tl.

With an above configured torque absorber in which the input shaft 4 is rotating in the free rotation direction (direction A in FIG. 1) while transmitting a torque less than Tl to the output side or the housing 14, if a torque larger than Tl is being loaded from the output side, the inner and outer rings 1 and 2 may slip relative to each other as described above, thus causing the rollers 3 to transmit only a torque Tl' less than or equal to Tl, resulting in continuation of the normal operation of the torque absorber transmitting only the torque Tl' (by absorbing the excess transient torque larger than the design torque capacity). And, then if a torque loaded from the output side becomes smaller than Tl', the inner and outer rings 1 and 2 may stop the relative rotation, thus restoring the normal rotation, or the capacity of transmitting the design maximum torque Tl. Therefore, the torque absorber can be said to best fit for auto-tension devices. FIG. 7 is a curve showing a typical change in transmission torque, thus verifying the effectiveness of a torque absorber according to the present invention when used for such applications.

Figure 8:
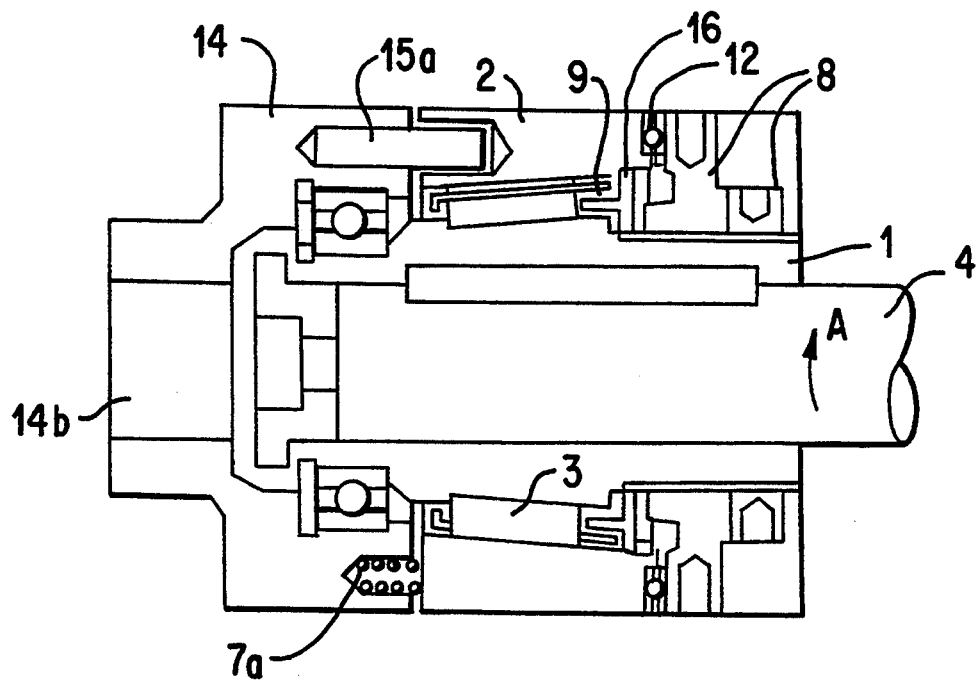
FIG. 8 is a sectional view showing an embodiment of the present invention.

FIG. 8 is a sectional view showing another embodiment of the present invention:

Description may be omitted for parts having the same construction as shown in FIG. 1.

As for the energizing means, a coil spring $7a$ is provided as shown in FIG. 8, thus pushing the outer ring 2 all the time so as to narrow the gap of the raceways $1a$ and $2a$. The housing 1,t or the power transmission rotation body is provided with a boss portion $14b$ thereon to transmit an input torque or power to the output side or a torque required from the output side to the input side. As for the torque transmission means, this embodiment uses torque transmission pin(s) $15a$.

The embodiment shown in FIG. 8 is similar to the one of shown in FIG. 1 in configuration at large, except for an addition of a movement stop member consisting of a double nut 8 and a thrust ball bearing 12. The double nut 8 is threaded onto the inner ring 1 and locked in place. As shown in FIG. 8, the thrust ball bearing 12 is inserted between the side end surface of the outer ring 2 and the double nut 8.

Figure 9:
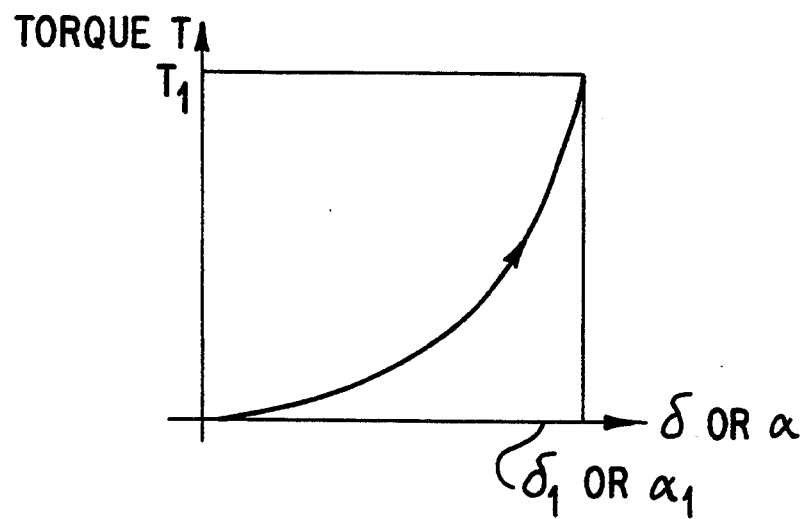
FIG. 9 is a characteristic curve showing a change in transmission torque in the embodiment shown in FIG. 8.

FIG. 9 is a characteristic curve showing a change in transmission torque in the embodiment of FIG. 8.

For simplification, the curve shows a case where the coil spring 7 functions only to absorb a possible axial play of the rotating outer ring 2 relative to the double nut 8 or the inner ring 1, not large enough to contribute to the transmission of torque itself.

The X axis of abscissa indicates an axial displacement placement $\delta$ of the outer ring 2 or a locking action angle $\alpha$ or a relative twist angle between the inner and outer rings 1 and 2. The Y axis of ordinates indicates a torque T (transmitted between the inner and outer rings 1 and 2 or between the shaft 4 and the housing 14) corresponding to the above $\delta$ or $\alpha$. In this case, since the inner ring 1 and the outer ring 2 has a relation like a tapered screw and a mating nut, the displacement $\delta$ is proportional to the twist angle $\alpha$.

The curve shows an increasing torque, as the shaft 4 or the inner ring 1 is being rotated in the A direction shown in FIG. 8, that is the clutch engagement direction. The torque becomes larger with an increasing twist of the outer ring 2 relative to the inner ring 1. The twist will reduce the gap of the raceways $1a$ and $2a$, thus causing the rollers 3 to be pinched between the inner and outer rings 1 and 2, so strongly as to create a wedge action between them. A transmission torque between the inner and outer rings 1 and 2 is proportional to a strength of the wedge action.

When the raceway gap is narrowed as the displacement placement $\delta$ increases, not only the outer ring 1 swells but also the contact portions of the rollers 3 with the inner and outer rings 1 and 2 deform. Since the force deforming the outer ring 1 is equivalent to an internal pressure widening the raceway gap, the force deforming the outer ring 1 is generated in proportion to the raceway gap. On the other hand, since the force locally deforming the rollers 3 increases the contact surface area as the raceway gap narrows, an increase in contact pressure between the rollers 3 and the raceways $1a$ and $2a$ may be two-dimensionally or secondary (not proportional to the deformation force itself). Therefore, a torque T to be generated by the displacement δ of the outer ring 1 may be expressed by the following formula.

$$T = A\delta^{3/2} \text{ or } = A'\delta^{3/2}$$

As the above formula shows, the torque T has a characteristic of a non-linear twist spring. Therefore, when the input torque is rising up sharply, the torque absorber will show a gradual increase in transmission torque due to a large angular displacement, thus while absorbing the transient impact torque, sooner or later transmitting a large torque up to the maximum design torque.

In addition to this desirable torque characteristic, the displacement δ of the outer ring 2 is restricted by the movement stop member or the double nut U and the thrust ball bearing 12 so as not to exceed a predetermined value, thus preventing transmission torque from exceeding the capacity of the torque absorber.

Now assume that the displacement δ is limited to δ1. When a torque larger than T1 corresponding to the δ1 is being applied on the torque absorber, the torque transmitting contact surfaces between the rollers 3 and the inner ring 1 and the outer ring 2, mainly the latter, make a relative rotation accompanied by an axial slip, thus transmitting the torque T1 while absorbing the surplus torque. As a result, for example when T1 is set at the rated torque, even if an impact torque larger than T1 is applied on the output side, the power transmission system cannot produce a torque exceeding the T1, thus preventing the inadvertent damage of the system. And, soon, when the impact torque is diminished into a torque smaller than T1, the system may run free from relative (slip) rotation, thus functioning as a desirable clutch. Therefore, this embodiment can be said to best fit for a torque limiter.

Figure 10:
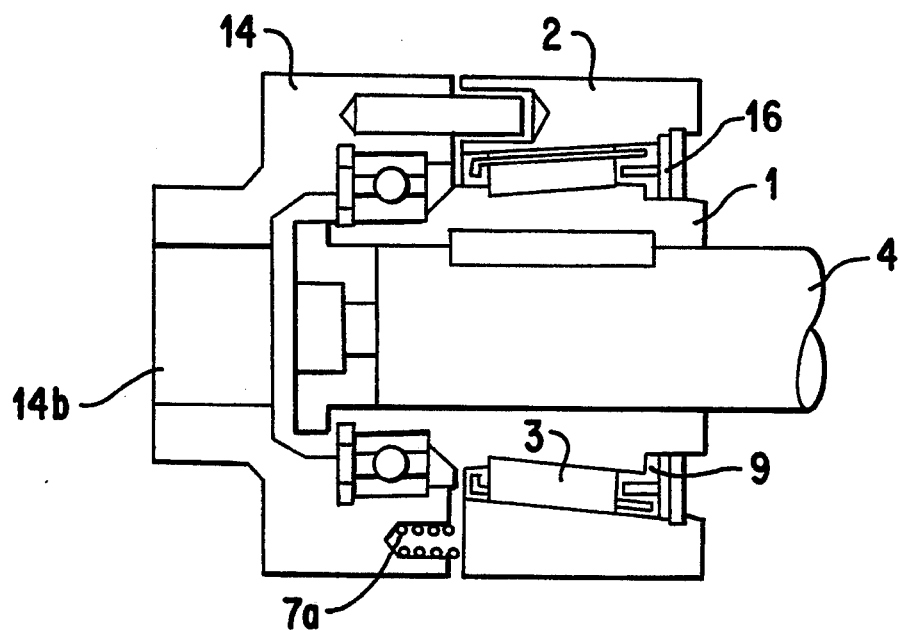
FIG. 10 is a sectional view showing an embodiment of the present invention.
Figure 11:
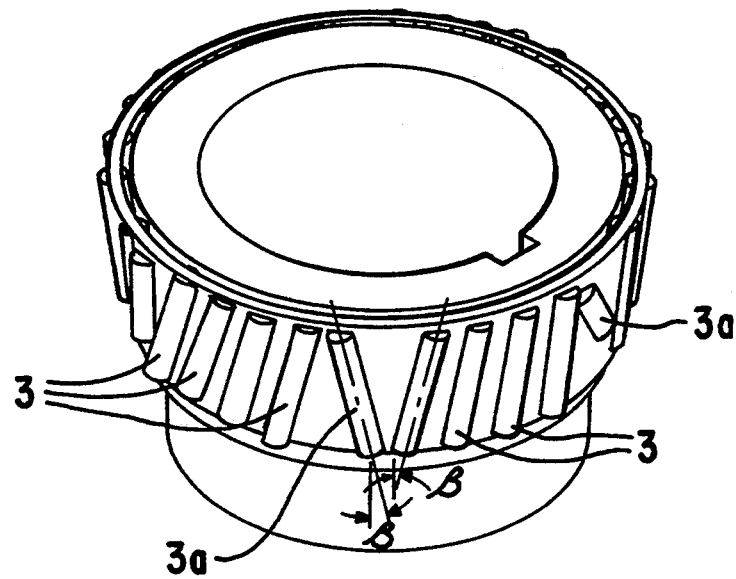
FIG. 11 is a perspective view showing the arrangement of the rollers in the embodiment of FIG. 10.

FIGS. 10 and 11 show another embodiment of the present invention, FIG. 10 being a sectional view of the entire configuration, and FIG. 11 being a perspective view showing the arrangement of the intermediate rotation body or the rollers in the embodiment.

The embodiment is similar in configuration, as shown in FIG. 10, to the one shown in FIG. 8, but the double nut 8 and the thrust ball bearing 12 are removed therefrom, so that the description of the overall configuration is omitted.

In FIG. 11, the intermediate rotation body consists of a first intermediate rotation body (rollers 3 functioning as clutching element) and a second intermediate rotation body (rollers 3a having a smaller diameter functioning as relative rotation element). The rollers 3 and 3a are arranged slanted by an angle β to a section including the shaft axis 6 but respectively in opposite directions to each other as shown in FIG. 11. When a torque is applied on the inner and outer rings 1 and 2 in the clutching direction, such a configuration causes, as described in the previous embodiment, not only the outer ring 2 to be screwed into a twisted shape so as to narrow the gap of the raceways 9 but also the rollers 3 to be deformed under normal forces from the inner and outer rings 1 and 2. When the deformation reaches the diametrical difference between the rollers 3 and 3a, the rollers 3a also come to contact with the raceways 1a and 2a. At tills instant, not only the rollers 3a serve to guide a relative rotation of the inner and outer rings 1 and 2 while lying between them, but also the rotating rollers 3a with an opposite slant angle cause the raceway 9 gap to be widened, thus preventing the outer ring 1 from being screwed in further. This condition allows for the inner and outer rings 1 and 2 to run relative to each other, absorbing the then torque as the maximum transmission torque.

Here, assume the diametrical difference between the rollers 3 and 3a is Δd. The functional relation of a transmission torque T1 (Δd) can be determined by experiment.

This embodiment is characterized in that a torque once applied at first may be maintained in a continued long period of operation. Coupled with the simple configuration, this embodiment is desirable for use in applications for absorbing or limiting an excessive torque. The positive and reliable operation of the embodiment can be said to best fit for frequent ON/OFF clutch applications.

Figure 12:
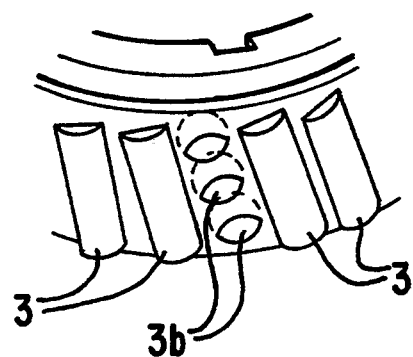
FIG. 12 is a perspective view showing the arrangement of the rollers and spheres in the present invention.

FIG. 12 is a perspective view showing the arrangement of intermediate rotation bodies (rollers and spheres).

This embodiment is different from the one shown in FIG. 10 in that spheres 3b having a diameter smaller than that of the rollers 3 are arranged in place of the rollers 3a as the second intermediate rotation bodies.

Such spheres 3b serve as ball bearing under radial forces when the outer ring 2 is screwed into so far as to narrow the raceway gap, thus causing the inner and outer rings 1 and 2 to start relative rotation. Therefore, the embodiment can transmit the then torque as the maximum transmission torque, thus absorbing a possible excess torque applied on the output side by the relative rotation.

Figure 13:
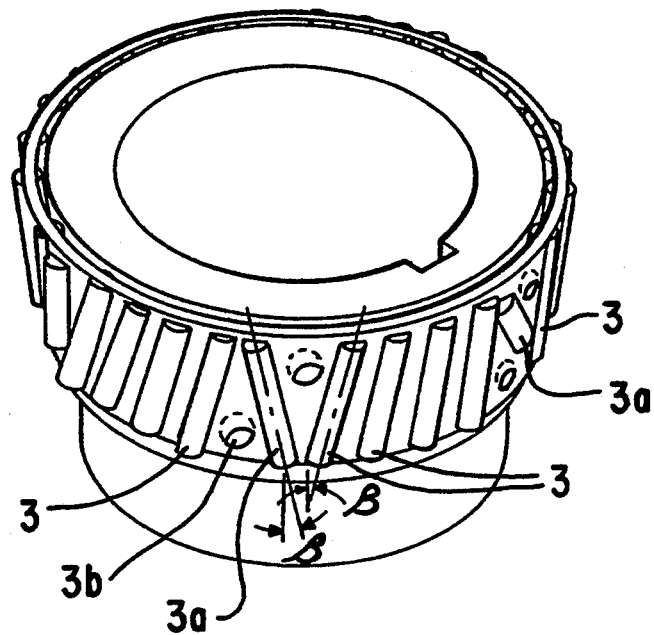
FIG. 13 is a perspective view showing the arrangement of the rollers and spheres in an embodiment of the invention.

FIG. 13 is a perspective view showing the arrangement of the rollers 3 and 3a and spheres 3b in an embodiment according to the combination (FIGS. 11 and 12). Such a configuration can utilize the space in the torque absorber effectively, thus enhancing an excessive load carrying capability.

This embodiment has a simpler configuration than the third embodiment, advantageous for applications having a small torque setting.

Figure 14:
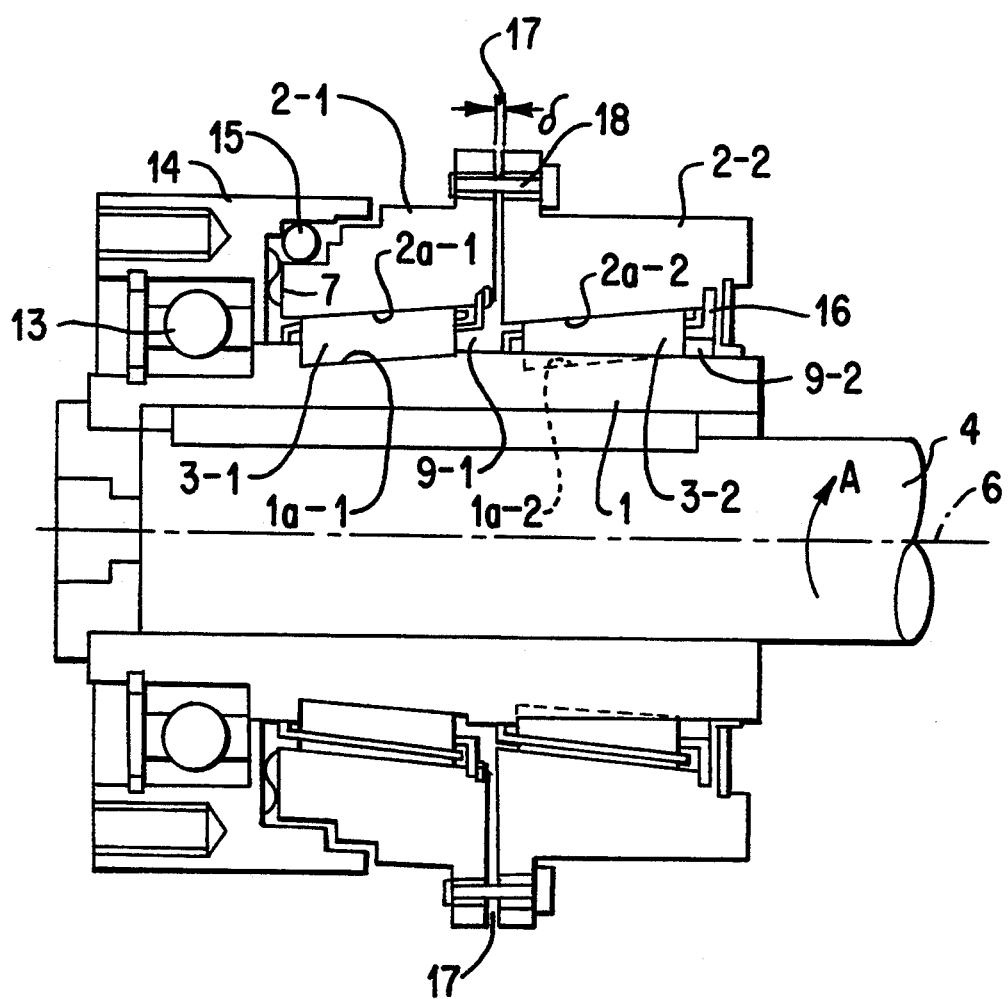
FIG. 14 is a sectional view showing an embodiment of the present invention.

FIG. 14 is a sectional view showing a fifth embodiment.

An inner rotation body or an inner ring 1 and first and second outer rotation bodies or outer rings 2-1 and 2-2 form raceways 9-1 and 9-2 so as to come into line contact with first and second intermediate rotation bodies or rollers 3-1 and 3-2. A power transmission rotation body or a housing 14 is mounted on one side (left side in FIG. 14) of the inner ring 1 through a bearing 13, and faces one end side (left) of the first outer ring 2-1. The housing 14 and the outer ring 2-1 are connected through a first torque transmission means or a ball spline 15 so that the outer ring 2-1 can move in the axial direction. The outer rings 2-1 and 2-2 are connected firmly by a second torque transmission means or screw pins 18 with a spacing maintained by a spacer 17 inserted between them so that they can move integrally as one block in the axial direction. When the outer ring 2-2 is energized by a spring plate 7, the rollers 3-1 come into contact with the inner and outer raceways 1a-1 and 2a-1 or the rollers 3-2 come into contact with the inner and outer raceways 1a-2 and 2a-2, so that the outer ring 2-1 or the outer ring 2-2 is energized by the spring force. Which outer ring is energized (2-1 or 2-2) depends on adjustment of the spacing.

The roller 3-1 and the rollers 3-2 are arranged slanting to a section including the common axis 6 by an angle of B but each in opposite direction to each other.

With this configuration and with the outer ring 2-1 being energized by the spring plate 7, when the shaft 4 or the inner ring 1 is rotated in the A direction, the outer ring 2-1 is screwed into as described above, thus advancing to the right in FIG. 14.

On the other hand, since the rollers 3-2 has an opposite slanting to the rollers 3-1, such a rotation of the shaft 4 or the inner ring 1 causes the outer ring 2-2 to be subjected to a force which tends to widen the raceway 9-2. Therefore, the outer ring 2-2 may make a free rotation in a direction in which a screw works loose, with a clearance between the rollers 3-2. And as the outer ring 2-1 is pushed to move to the right, the outer ring 2-2 and the rollers 3-2 will lose the initial clearance, when the outer ring 2-1 will be applied by a force from the outer ring 2-2 in such a direction as to widen the raceway gap (in the left in FIG. 14), thus stopping a farther rightward movement, resulting in torque transmission corresponding to this location of the outer ring 2-1. If much larger torque is applied, the inner and outer rings make relative rotation to each other to absorb surplus torque.

In this connection, if the shaft 4 or the inner ring 1 is rotated in the direction opposite to A, the outer ring 2-1 moves against the energizing force of the spring plate 7 in such a direction as to widen the gap of the raceway 9-1. On the other hand, the outer ring 2-2 is moved in such a direction as to narrow the gap of the raceway 9-2, but it is not energized by the spring plate 7, titus being free from locking with the inner ring 1, resulting in a free rotation.

On the contrary, if adjustment of the spacer 17 is made so as to push the outer ring 2-2 by the spring plate 7, the embodiment makes an opposite operation from that above: If the shaft 4 or the inner ring 1 is rotated in the direction opposite to A, the outer ring 2-2 moves to the right by the action of the rollers 3-2 when the output side is applied by torque. Following the right movement of the outer ring 2-2, the outer ring 2-1 is moved to the right, when the rollers 3-1 make contact with the inner and outer raceways 1a-1 and 2a-1, thus causing the outer ring 2-1 to advance to the left to have a free rotation, and the axial movement of the outer ring 2-2 to be brought to a stop, resulting in a relative rotation of the inner and outer ring under this condition, transmitting a torque.

In this connection, if the outer ring 2-1 is energized by the spring plate 7, it is not necessary that a relative axial position of the outer ring 2-1 to the outer ring 2-2 be maintained to a constant.

The maximum transmission torque obtained when the embodiment is rotated in the clutch direction depends on a spacing δ, and is calculated by the formula (1).

Since this embodiment includes heavy-duty rolling clutch and bearing, it can transmit an extremely large torque. Therefore, it can serve as not only a common torque limiter and an auto-tension device, but also as an anti-rolling brake for an automobile that can eliminate the adverse effect caused by an extremely quick braking.

Common metals with certain strength and elasticity will suffice for manufacturing all of the above embodiments.

When using metals as opposed to non-metals con, only used in the prior art, an extremely large allowable surface contact pressure can be taken, so that the torque absorber can be so compact and the rotational inertia can be so small that it can be said to best fit high speed applications. Further, the use of rolling resistance between metals may minimize a change in friction coefficient associated with temperature, dust, oil and other extrinsic factors, thus promising a stable torque control. Further, the good heat conductivity of metals can dissipate very quickly the heat to be generated by absorbing an excessive transient torque, thus enhancing an excessive torque absorption capability.

Figure 15:
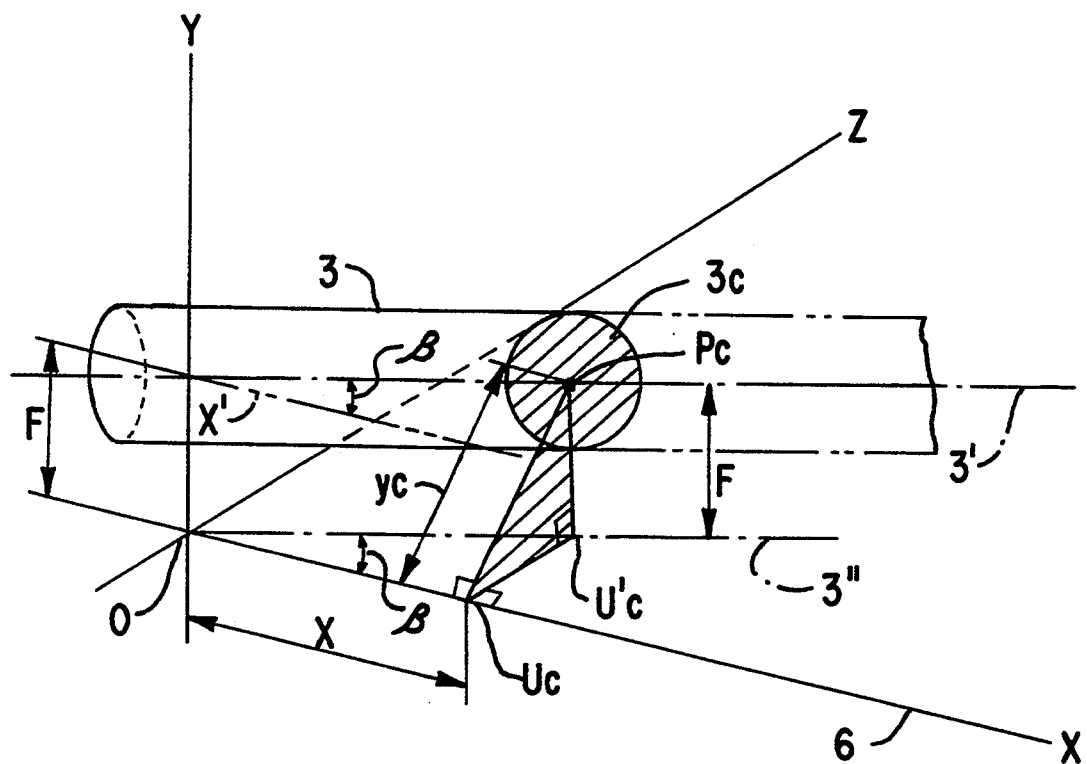
FIGS. 15, 16 and 17 are schematic diagrams for determining a raceway surface shape.
Figure 16:
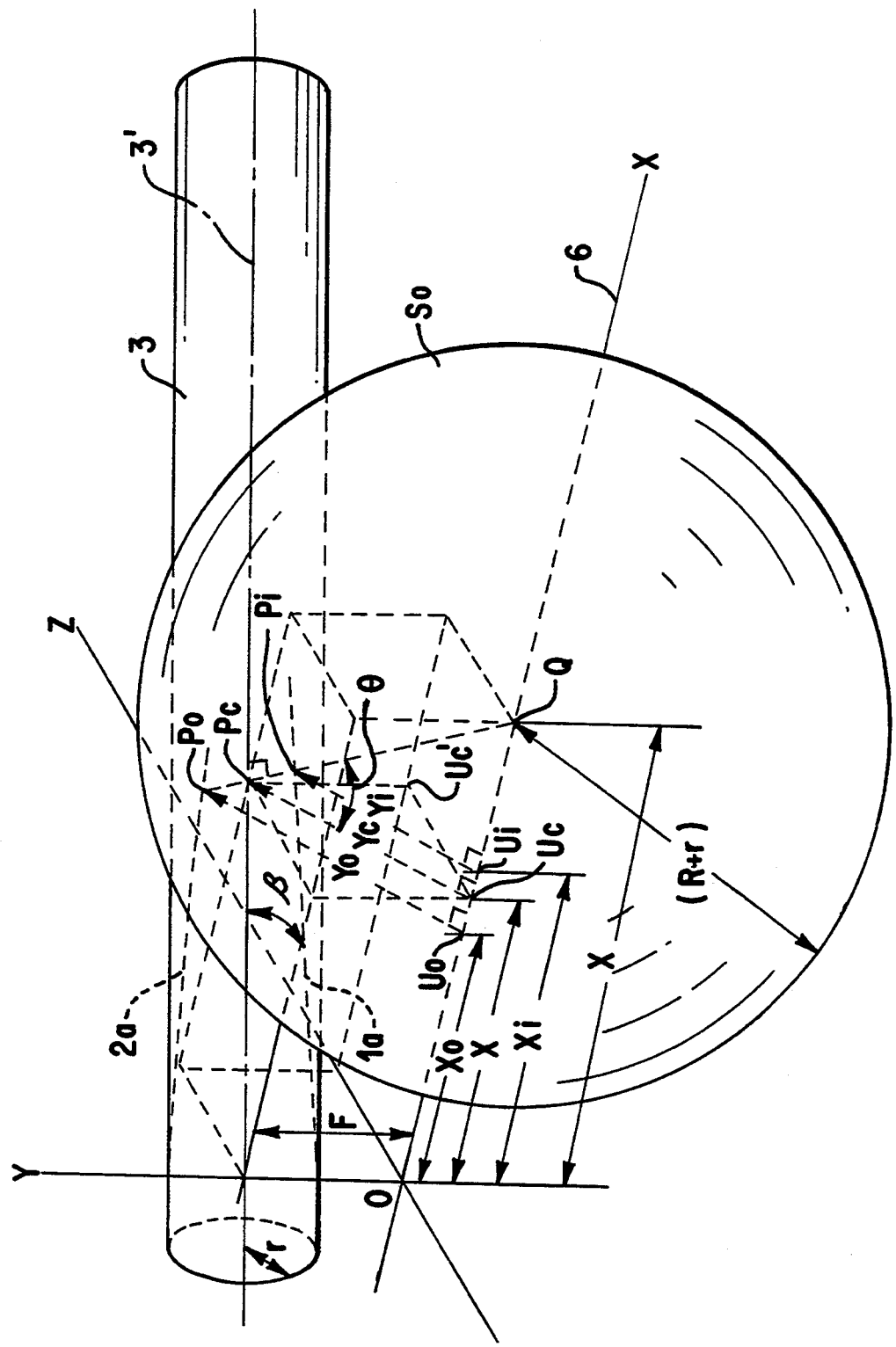
Figure 17:
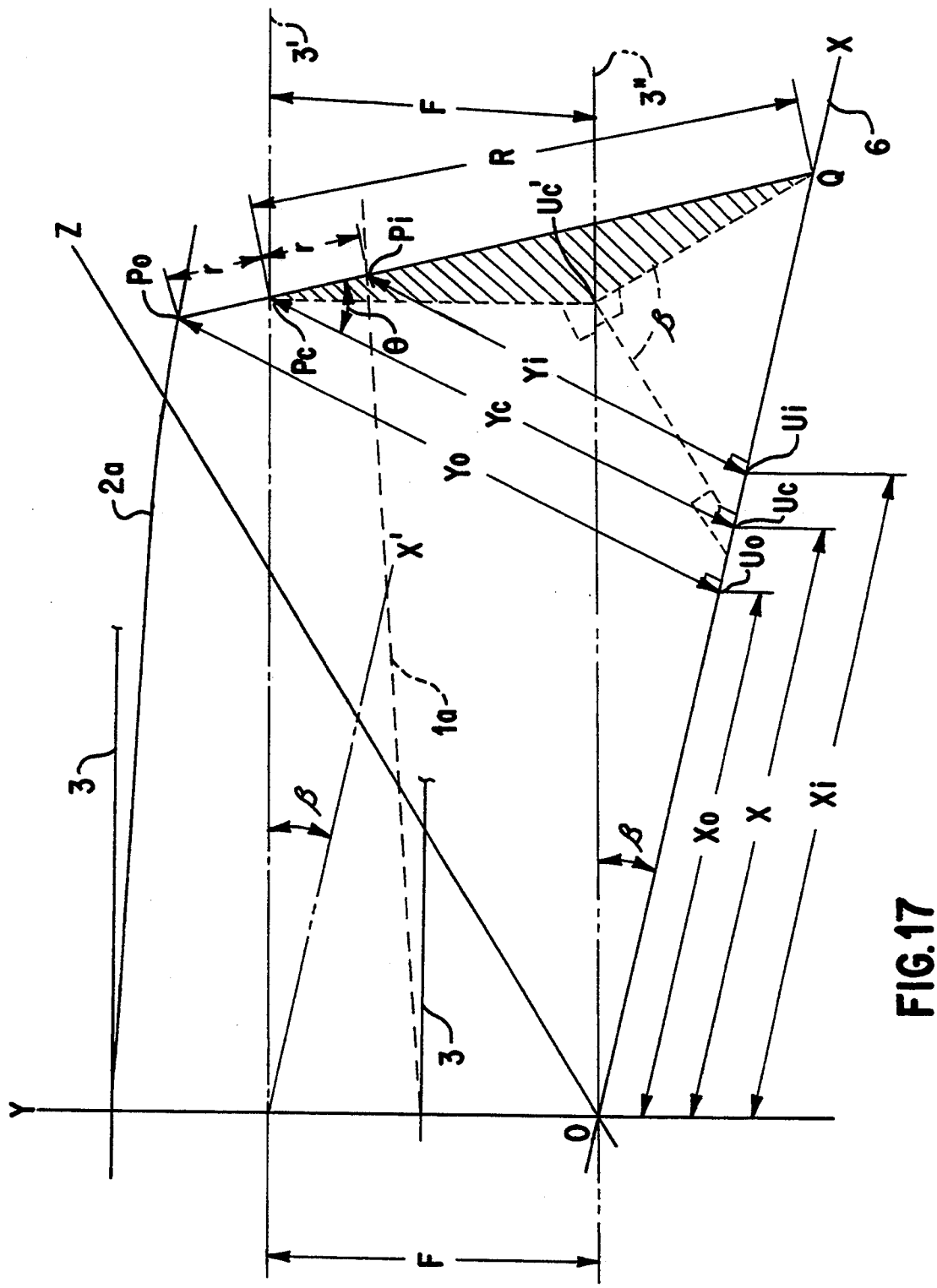

Now, shapes of the inner and outer ring raceways $1a$ and $2a$ required for the line contact of the rollers 3 with them will be described as follows:

FIGS. 15 to 17 are explanatory drawings for determining the raceway surface shapes in the case of cylindrical rollers 3.

FIG. 15 is a perspective view showing X-Y-Z coordinates, in which a roller 3 is so placed that its axis 3' passes through the Y axis a distance F away from the origin 0, in parallel to the X-Y plane, slanting to the X-Y plane at an angle of $\beta$. The X axis represents the common axis 6 of the inner and outer rings 1 and 2. The section $3c$ of the roller 3 shows a section cut by a parallel plane to the X-Y plane passing the X axis at an arbitrary position x. Points Uc and U'c are respectively intersections with the X axis and the X-Z plane, of perpendiculars drawn from the center Pc of the cross section to the X axis and the X-Z plane. The line 3'' passing the origin 0 and the point U'c is a projected line of the roller axis 3' to the X-Z plane, forming an angle $\beta$ with the X axis. Apparently referring to FIG. 15, Distance from Uc to U'c=x tan $\beta$ Distance from Pc to U'c=F Therefore, designating a distance from the rotation axis 6 of the rings (or X axis) to the center Pc of the roller 3 as yc, $yc^2 = F^2 + (X\tan\beta)^2$ Accordingly, $$y_c^2/F^2 - x^2/(F/\tan\beta)^2 = 1 \qquad (3)$$

Since the equation (3) is a hyperbola, the axis line of the rollers 3, that is, the center line of the raceway formed with the inner and outer rings 1 and 2 is hyperbolic with respect to the rotation axis 6 of the rings.

FIG. 16 is a drawing for explaining how the rings 1 and 2 come into contact with the roller 3 arranged as above.

Designate as Q an intersection of the axis X with a plane which passes the center Pc of the roller 3 at right angle with the axis 3' of the roller 3. Considering spheres Si and So (only So is shown in FIG. 16) having the same center Q, which are respectively inscribed and circumscribed to the rollers, contact points Pi and Po of the roller 3 with the spheres Si and So would be on a perpendicular connecting the points Q and Pc, respectively the radius r of the roller 3 apart from the point Pc. Therefore, designating the distance from point Q to point Pc as R, the radii of the spheres Si and So would be respectively (R−r) and (R+r).

Designating as Ui and Uo the intersections of planes passing the points Pi and Po in parallel to the Y-Z plane with the X axis (see FIG. 17), the lengths yi and yo of the segments PiUi and PoUo are respectively distances from the points Pi and Po to the X axis, and the distances xi and xo from the origin O to the points Ui and Uo are respectively the X axis coordinates of the points Pi and Po. Therefore, functions F (xi, yi) and F (xo, yo)

represent the curved surface shapes of the raceways $1a$ and $2a$ of the inner and outer rings 1 and 2.

FIG. 17 is an enlarged view showing related portions to the determination of these functions.

Since segment QPc (equal to R) is at right angle with the center axis $3'$ of the roller 3, and the point $U'c$ is an intersection of a perpendicular from the point Pc to the X-Z plane therewith, segment $U'cQ$ is at right angle with the axis $3''$. Therefore, $$\text{Distance from point 0 to point } Q = (x/\cos\beta)/\cos\beta$$
$$= x/\cos^2\beta$$

$$R^2 = F^2 + \{(x/\cos^2\beta)\sin\beta\}^2$$
$$= F^2 + x^2\tan^2\beta/\cos^2\beta$$

Then, designating an angle QPcUc as $\theta$, since triangle QPcUc is a right angle, $$\cos\phi = \frac{yc}{R} = \frac{\sqrt{F^2 + x^2\tan^2\beta}}{\sqrt{F^2 + x^2\tan^2\beta/\cos^2\beta}}$$

$$\sin\phi = \frac{UcQ}{R} = \frac{x\tan^2\beta}{\sqrt{F^2 + x^2\tan^2\beta/\cos^2\beta}}$$

On the other hand, since the length of segments PcPi and PcPo equal r, and triangles QPiUi and QpoUo are similar to triangle QPcUc, $$xi = x + r\sin\phi = x + xr\frac{\tan^2\beta}{\sqrt{F^2 + x^2\tan^2\beta/\cos^2\beta}} \quad (4)$$

$$xo = x - r\sin\phi = x - xr\frac{\tan^2\beta}{\sqrt{F^2 + x^2\tan^2\beta/\cos^2\beta}} \quad (5)$$

$$yi = yc - r\cos\phi = \quad (6)$$

$$\sqrt{F^2 + x^2\tan^2\beta}\left(1 - \frac{r}{\sqrt{F^2 + x^2\tan^2\beta/\cos^2\beta}}\right)$$

$$yo = yc + r\cos\phi = \quad (7)$$

$$\sqrt{F^2 + x^2\tan^2\beta}\left(1 + \frac{r}{\sqrt{F^2 + x^2\tan^2\beta/\cos^2\beta}}\right)$$

From these above equations, F (xi, yi) and F (xo, yo) are introduced as follows:

$$yi = \frac{\sqrt{F^2 + x^2\tan^2\beta}\left(1 - \frac{r}{\sqrt{F^2 + x^2\tan^2\beta/\cos^2\beta}}\right)}{x\left(1 + \frac{r\tan^2\beta}{\sqrt{F^2 + x^2\tan^2\beta/\cos^2\beta}}\right)} xi$$

$$yo = \frac{\sqrt{F^2 + x^2\tan^2\beta}\left(1 + \frac{r}{\sqrt{F^2 + x^2\tan^2\beta/\cos^2\beta}}\right)}{x\left(1 - \frac{r\tan^2\beta}{\sqrt{F^2 + x^2\tan^2\beta/\cos^2\beta}}\right)} xo$$

These equations express only that the inner and outer raceways $1a$ and $2a$ have shapes of quadratic curved surface. Obtaining ratios of $(xi-x)/(yi-yc)$ and $(xo-x)/(yo-yc)$, from the equations (4) to (7), $$\frac{xi - x}{yi - yc} = \frac{r\sin\phi}{-r\cos\phi} = \frac{x}{yc}\tan^2\beta$$

$$\frac{xo - x}{yo - yc} = \frac{-r\sin\phi}{r\cos\phi} = -\frac{x}{yc}\tan^2\beta$$

Since the relation of x and yc is hyperbolic from the equation (3), and $\tan^2\beta$ in the above equations is constant, the relations of xi and yi as well as xo and yo are hyperbolic. As a result, the inner and outer raceways $1a$ and $2a$ are mono-hyperboloids of revolution about the common axis 6.

Assuming for example $$yi^2/ai^2 - xi^2/bi^2 = 1$$

$$yo^2/ao^2 - xo^2/bo^2 = 1$$

$$F=9, r=1.5, \text{ and } \beta=15°,$$

ai, bi, ao and bo are respectively calculated to be 7.5, 30.7, 10.5 and 36.2, thus giving numerically the inner and outer raceway surfaces as mono-hyperboloid.

The above embodiments have a cylindrical rolling surface of the rollers 3, but may be replaced with conical, hourglass or convex drum shape of rolling surface. In this case also, the rollers 3 are brought into line contact with the inner and outer rings 1 and 2. For this reason, in the case of conical rolling surface, since the generating line of a conical roller is a straight line, the inner and outer raceway surfaces are designed to be mono-hyperboloid of revolution like the case of cylindrical rollers. In the case where a roller surface is produced by rotating a partial arc of an ellipse about the outer axis into hourglass shape, the inner ring is formed into a cylindrical shape and the outer ring is a combination of elliptic and hyperbolic surfaces of revolution. In the case where a roller surface is produced by rotating a partial arc of an ellipse about the center axis into a convex drum shape, the outer ring is formed a cylindrical shape and the inner ring is into a combination of elliptic and hyperbolic surfaces of revolution.

As described above in detail, with the torque absorber according to the present invention:

Provision of intermediate rotation bodies (the rollers) between the inner and outer rings so as to have a line contact with them can absorb a torque due to rolling resistance to be generated between the rollers and the inner and outer rings, resulting in a stable setting of torque to be absorbed or transmitted.

What is claimed is:

1. A torque absorber comprising:
   an inner rotation body, an outer rotation body, a plurality of intermediate rotation bodies, an energizing means, a power transmission rotation body and a movement stop member; and
   said inner rotation body being provided with an inner raceway track of mono-hyperboloid of revolution about a common axis;
   said outer rotation body being provided with an outer raceway track of mono-hyperboloid of revolution about said common axis;
   said inner raceway track and said outer raceway track facing each other to form a set of combined raceways;

said intermediate rotation bodies having cylindrical rolling surfaces and being arranged with their center axis at an angle to a cross section including said common axis, and the surface of said intermediate rotation bodies being arranged so as to come into linear contact with said inner raceway and said outer raceway;

said power transmission rotation body being arranged on one end side of said outer rotation body and around one side of said inner rotation body through a bearing, so as to be rotatable relative to said inner rotation body while keeping a constant axial position relative to said inner rotation body, and being connected with said outer rotation body by a torque transmission means which transmits a torque between said power transmission rotation body and said outer rotation body;

said energizing means being arranged between said power transmission rotation body and said outer rotation body, to energize said outer rotation body in said axial direction and in such a direction as to narrow the raceway gap; and said movement stop member being provided to bring the movement of said outer rotation body in the direction to narrow said raceway gap to a stop at a given position through a guide bearing.

2. A torque absorber comprising:

an inner rotation body, an outer rotation body, a plurality of first large-diameter intermediate rotation bodies, a plurality of second small-diameter intermediate rotation bodies, an energizing means and a power transmission rotation body; and said inner rotation body being provided with an inner raceway track of mono-hyperboloid of revolution about a common axis;

said outer rotation body being provided with an outer raceway track of mono-hyperboloid of revolution about said common axis;

said inner raceway track and said outer raceway track facing each other to form a set of combined raceways;

said first large-diameter intermediate rotation bodies and said second small-diameter intermediate rotation bodies having cylindrical rolling surfaces and being arranged with their respective center axes being at angles opposite each other and at angles to a cross section including said common axis, and the surface of said respective intermediate rotation bodies being arranged so as to come into linear contact with said inner raceway and said outer raceway;

said power transmission rotation body being arranged on one end side of said outer rotation body and around one side of said inner rotation body through a bearing, so as to be rotatable relative to said inner rotation body while keeping a constant axial position relative to said inner rotation body, and being connected with said outer rotation body by a torque transmission means which transmits a torque between said power transmission rotation body and said outer rotation body; and said energizing means being arranged between said power transmission rotation body and said outer rotation body, to energize said outer rotation body in said axial direction and in such a direction as to narrow the raceway gap.

3. A torque absorber comprising:

an inner rotation body, an outer rotation body, a plurality of first large-diameter intermediate rotation bodies, a plurality of second small-diameter intermediate rotation bodies, an energizing means and a power transmission rotation body; and said inner rotation body being provided with an inner raceway track of mono-hyperboloid of revolution about a common axis;

said outer rotation body being provided with an outer raceway track of mono-hyperboloid of revolution about said common axis;

said inner raceway track and said outer raceway track facing each other to form a set of combined raceways;

said first large-diameter intermediate rotation bodies having cylindrical rolling surfaces and said second small-diameter intermediate rotation bodies having spherical rolling surfaces, said first large-diameter intermediate rotation bodies and said second small-diameter intermediate rotation bodies being arranged with their respective center axes being at angles opposite each other and at angles to a cross section including said common axis, and the surface of said first large-diameter intermediate rotation bodies being arranged so as to come into linear contact with said inner raceway and said outer raceway;

said power transmission rotation body being arranged on one end side of said outer rotation body and around one side of said inner rotation body through a bearing, so as to be rotatable relative to said inner rotation body while keeping a constant axial position relative to said inner rotation body, and being connected with said outer rotation body by a torque transmission means which transmits a torque between said power transmission rotation body and said outer rotation body; and said energizing means being arranged between said power transmission rotation body and said outer rotation body, to energize said outer rotation body in said axial direction and in such a direction as to narrow the raceway gap.

* * * * *